US011403407B2

(12) United States Patent
Veeningen

(10) Patent No.: US 11,403,407 B2
(45) Date of Patent: Aug. 2, 2022

(54) OBLIVIOUS OUTSOURCING OF FILE STORAGE

(71) Applicant: KONINKLIJKE PHILIPS N.V., Eindhoven (NL)

(72) Inventor: Meilof Geert Veeningen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 704 days.

(21) Appl. No.: 16/334,060

(22) PCT Filed: Sep. 19, 2017

(86) PCT No.: PCT/EP2017/073607
§ 371 (c)(1),
(2) Date: Mar. 18, 2019

(87) PCT Pub. No.: WO2018/050911
PCT Pub. Date: Mar. 22, 2018

(65) Prior Publication Data
US 2019/0272379 A1    Sep. 5, 2019

Related U.S. Application Data

(60) Provisional application No. 62/396,502, filed on Sep. 19, 2016.

(51) Int. Cl.
*G06F 21/60* (2013.01)
*G06F 16/182* (2019.01)
(Continued)

(52) U.S. Cl.
CPC ............ *G06F 21/602* (2013.01); *G06F 16/00* (2019.01); *G06F 16/13* (2019.01); *G06F 16/182* (2019.01);
(Continued)

(58) Field of Classification Search
CPC ........ G06F 21/602; G06F 16/00; G06F 16/13; G06F 16/182; G06F 16/2246;
(Continued)

(56) References Cited

U.S. PATENT DOCUMENTS 5,495,533 A     2/1996  Linehan et al.
7,171,557 B2 *  1/2007  Kallahalla ........... G06F 21/6218
                                                  380/277
(Continued)

FOREIGN PATENT DOCUMENTS

| CN | 104780174 A | 7/2015 |
| CN | 104811448 A | 7/2015 |
| CN | 104901949 A | 9/2015 |

OTHER PUBLICATIONS

Boneh, et al., "Key Homomorphic PRFs and Their Applications", In Proc of Crypto, vol. 8043 of LNCS, Feb. 2, 2014, 374 pages.
(Continued)

*Primary Examiner* — Beemnet W Dada

(57) ABSTRACT

Various embodiments described herein relate to a system for providing file access while keeping both the accessing client and storage server from gaining any information about file contents or access patterns which they are not authorized to obtain. According to various embodiments, a key server instructs the storage server to retrieve a list of files, shuffle and re-encrypt the files in the list, and then send the list to the client. According to some embodiments, the key server also provides the client with information used to access the requested file from the list, re-encrypts the files in the lists again, reshuffles the list, and transmits the list back to the storage server to be recommitted to storage.

19 Claims, 11 Drawing Sheets

(51) Int. Cl.
| | |
|---|---|
| *G06F 16/22* | (2019.01) |
| *G06F 21/62* | (2013.01) |
| *H04L 9/08* | (2006.01) |
| *H04L 9/32* | (2006.01) |
| *G06F 16/13* | (2019.01) |
| *G06F 16/00* | (2019.01) |
| *H04L 67/01* | (2022.01) |

(52) U.S. Cl.
CPC ...... *G06F 16/2246* (2019.01); *G06F 21/6218* (2013.01); *H04L 9/0819* (2013.01); *H04L 9/0894* (2013.01); *H04L 9/3213* (2013.01); *H04L 67/42* (2013.01)

(58) Field of Classification Search
CPC ... G06F 21/6218; G06F 16/18; H04L 9/0819; H04L 9/0894; H04L 9/3213; H04L 67/42
See application file for complete search history.

(56) References Cited

U.S. PATENT DOCUMENTS

| | | | |
|---|---|---|---|
| 8,364,979 | B1 | 1/2013 | Ostrovsky |
| 8,943,331 | B2 | 1/2015 | Kolesnikov |
| 11,018,858 | B2* | 5/2021 | Karame ................ H04L 9/0891 |
| 2010/0106920 | A1 | 4/2010 | Anckaert et al. |
| 2018/0025167 | A1* | 1/2018 | Bohli ........................ H04L 9/14 713/193 |
| 2021/0271764 | A1* | 9/2021 | Bohli ...................... G06F 21/64 |

OTHER PUBLICATIONS

Oded, et al., "Software protection and simulation on oblivious rams", J. ACM, 43(3):431-473, 1996. (Abstract).

Kantarcioglu, et al., "Access pattern disclosure on searchable encryption: Ramification, attack and mitigation", In 19th Annual Network and Distributed System Security Symposium, NDSS 2012, San Diego, California, USA, Feb. 5-8, 2012. The Internet Society, 2012, 24 pages.

Jinsheng, et al., "A multi-user oblivious ram for outsourced data", Computer ScienceTechnical report, Iowa State University, 2014, 15 pages.

Karvelas, et al., "Privacy-preserving whole genome sequence processing through proxy-aided ORAM", Proceedings of the 13th Workshop on Privacy in the Electronic Society, WPES 2014, Scottsdale, AZ, USA, Nov. 3, 2014, pp. 1-10.

Lorch, et al., "Toward practical private access to data centers via parallel ORAM", IACR Cryptology ePrint Archive, 2012:133, 2012, pp. 1-20.

Maffei, et al., "Privacy and access control for outsourced personal records", 2015 IEEE Symposium on Security and Privacy, pp. 341-358.

Ren, et al., "Design space exploration and optimization of path oblivious RAM in secure processors", The 40th Annual International Symposium on Computer Architecture, ISCA'13, Tel-Aviv, Israel, Jun. 23-27, 2013, pp. 1-13.

Sadeghi, et al., 2013 ACM SIGSAC Conference on Computer and Communications Security, CCS'13, Berlin, Germany, Nov. 4-8, 2013. ACM, 2013. (Abstract).

L. Seitz, et al., "Encrypted storage of medical data on a grid", In Methods Inf Med, pp. 198-201, 2005. (Abstract).

Stefanov, et al., "Multi-cloud oblivious storage", pp. 247-258.

Stefanov, et al., "Path ORAM: an extremely simple oblivious RAM protocol", pp. 1-25.

O. Ohrimenko, "Data-Oblivious Algorithms for Privacy-Preserving access to Cloud Storage", Providence, Rhode Island, May 2014, (Abstract).

Vimercati, et al., Efficient and Private Access to Outsourced Data, 10 pages (Abstract).

Vimercati, et al., "Protecting access confidentiality with data distribution and swapping", 2014 IEEE, 8 pages (Abstract).

Vimercati, et al., "Shuffle Index: Efficient and Private Access to Outsourced Data", ACM Transactions on Storage (TOS), vol. 11, Issue 4, Oct. 2015, 55 pages.

* cited by examiner

OBLIVIOUS OUTSOURCING OF FILE STORAGE

CROSS-REFERENCE TO PRIOR APPLICATIONS

This application is the U.S. National Phase application under 35 U.S.C. § 371 of International Application No. PCT/EP2017/073607, filed on Sep. 19, 2017, which claims the benefit of Provisional Application Ser. No. 62/396,502, filed Sep. 19, 2016. These applications are hereby incorporated by reference herein, for all purposes.

TECHNICAL FIELD

Various embodiments described herein relate to cryptography and more particularly, but not exclusively, to information security in multiple user data storage systems.

BACKGROUND

When data needs to be shared between multiple users, a common approach is to host the data on a file server. For example, medical data may be stored in file servers within hospitals or even on external cloud-based file servers, so that doctors and researchers can access them. On the consumer side, storage services are provided by DROPBOX, GOOGLE, or RACKSPACE to store their files and share them with others. To ensure that data is only accessible by people with sufficient access rights, multi-user systems sometimes employ a trusted key server that stores keys securely and applies access control.

However, in many situations, access patterns of data are sensitive in addition to the actual file contents. This may be the case, for example, for researchers performing research on a dataset with large patient records (e.g., containing pictures or genetic information). Here, the particular subset of a patent record that a researcher inspects, tells a lot about what kind of condition for which the researcher is looking, so it is important both from the point of view of the patient and the researcher to protect this information. In other contexts, it has been shown that statistical inference techniques on access patterns reveal surprising amounts of information, e.g., up to 80% of search queries on an encrypted e-mail database.

SUMMARY

In view of the foregoing, it would be desirable to provide a system wherein access patterns are to be hidden, both from the storage system and from other parties using it. Further, it would be desirable to provide such a system that, while utilizing a key server, does not overburden the key server with relatively costly computations during file access.

Accordingly, various embodiment described herein provide a key server that directs a storage server and client server in how to sufficiently obfuscate both data and access patterns such that neither party to the file access operation gains information which it is not authorized to have. By "outsourcing" certain actions, the relatively costly obfuscation techniques (e.g. re-encryption and permutation) can be performed between the storage server(s) and client(s), thereby spreading the load rather than requiring a single key server to perform all such operations.

Various embodiments described herein relate to a method performed by a key server for facilitating access to a file; a key server including, among other hardware, a communication interface, a memory, and a processor configured to perform the method; and a non-transitory machine-readable medium encoded with instructions for performing the method, the method including: receiving, from a client device, an indication of a requested file; identifying an ordered grouping of files to which the requested file belongs on a storage server; determining an index of the requested file within the grouping; instructing the storage server to transmit the grouping of files to the client device; and transmitting the index to the client device.

Various embodiments are described wherein each file in the grouping of files is encrypted, the method further including: determining an encryption key to be used in decrypting the requested file; and transmitting the encryption key to the client device.

Various embodiments additionally include generating a re-encryption token to be applied to re-encrypt the requested file; and transmitting the re-encryption token to the storage server, wherein the encryption key is suitable to decrypt the requested file after the requested file has been re-encrypted according to the re-encryption token.

Various embodiments are described wherein the step of generating a re-encryption token includes generating a set of re-encryption tokens to be applied to re-encrypt respective files within the ordered grouping of files.

Various embodiments additionally include generating a re-encryption token to be applied to re-encrypt the requested file; and transmitting the re-encryption token to the client device.

Various embodiments additionally include retrieving a master encryption key previously stored for the requested file; transforming the master encryption key based on the re-encryption token; and storing the transformed master encryption key for the requested file.

Various embodiments additionally include identifying a permutation to be used to shuffle the ordered grouping; and transmitting the permutation to the storage server, wherein the index is suitable to locate the requested file within the ordered grouping after the ordered grouping has been shuffled according to the permutation.

Various embodiments additionally include identifying a permutation to be used to shuffle the ordered grouping; and transmitting the permutation to the client device.

Various embodiments additionally include selecting a new grouping of files for the requested file at random; identifying a new location of the requested file within a data structure including a plurality of overlapping groupings, wherein the new location belongs to both the ordered grouping of files and the new grouping of files; and storing the new location for the requested file, wherein the permutation defines a new order for the ordered grouping of files that includes the requested file at position corresponding to the new location.

Various embodiments described herein relate to a method performed by a storage server; a storage server including, among other hardware, a communication interface, a memory, and a processor configured to perform the method; and a non-transitory machine-readable medium encoded with instructions for performing the method, the method including: receiving, from a key server, an identification of a grouping of files and an instruction to perform an obfuscating operation on the grouping of files; retrieving the grouping of files from a data store of the storage server; performing the obfuscating operation on the grouping of files; and transmitting the grouping of files to a client device.

Various embodiments are described wherein the data store includes a tree data structure storing a plurality of files, the identification of the grouping of files is an identification of a leaf node of the tree data structure, and retrieving the grouping of files includes retrieving files stored on the tree between a root node and the identified leaf node of the tree data structure.

Various embodiments additionally include receiving a modified version of the grouping of files from the client device; and storing the modified version of the grouping of files in the data store in place of the grouping of files.

Various embodiments are described wherein: the grouping of files is an ordered grouping of files, the instruction to perform an obfuscating operation includes a permutation of the ordered grouping of files, and performing the obfuscating operation includes shuffling the ordered grouping of files according to the permutation.

Various embodiments are described wherein: the respective files within the grouping of files are encrypted, the instruction to perform an obfuscating operation includes a set of re-encryption tokens, and performing the obfuscating operation includes re-encrypting respective files within the grouping of files based on corresponding re-encryption tokens of the set of re-encryption tokens.

Various embodiments are described wherein performing the obfuscation operation includes: re-encrypting respective files within the ordered grouping of files; and shuffling the ordered grouping of files.

Various embodiments described herein relate to a method performed by a client device for accessing a file; a client device including, among other hardware, a communication interface, a memory, and a processor configured to perform the method; and a non-transitory machine-readable medium encoded with instructions for performing the method, the method including: requesting, from a key server, access to a requested file; receiving, from the key server, an index and an instruction to perform an obfuscating operation; receiving, from a storage server, an ordered grouping of files; retrieving the requested file from the ordered grouping of files at a location specified by the index; performing the obfuscating operation on the ordered grouping of files; and transmitting the obfuscated ordered grouping of files to the storage server.

Various embodiments are described wherein, the instruction to perform the obfuscating operation includes a permutation of the ordered grouping of files, and performing the obfuscating operation includes shuffling the ordered grouping of files according to the permutation.

Various embodiments are described wherein the requested file is encrypted in the ordered grouping of files, the method further including: receiving, from the key server, an encryption key; and decrypting the requested file using the encryption key.

Various embodiments are described wherein: the instruction to perform an obfuscating operation includes a set of re-encryption tokens, and performing the obfuscating operation includes re-encrypting respective files within the ordered grouping of files based on corresponding re-encryption tokens of the set of re-encryption tokens.

Various embodiments additionally include obtaining a modified version of the requested file; and inserting the modified version of the requested file into the ordered grouping prior to performing the obfuscating operation.

Various embodiments are described wherein performing the obfuscation operation includes: re-encrypting respective files within the ordered grouping of files; and shuffling the ordered grouping of files.

BRIEF DESCRIPTION OF THE DRAWINGS

In order to better understand various example embodiments, reference is made to the accompanying drawings, wherein.

DETAILED DESCRIPTION

The description and drawings presented herein illustrate various principles. It will be appreciated that those skilled in the art will be able to devise various arrangements that, although not explicitly described or shown herein, embody these principles and are included within the scope of this disclosure. The term, "or," as used herein, refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein.

In view of the foregoing, various embodiments provide a system that hides both data and access patterns through obfuscation techniques that can be performed at a storage server hosting the data or a client device. For example, according to various embodiments described below, upon request for a file, a storage server shuffles and re-encrypts a list of files (including the requested file) for delivery to the client device. After accessing the requested file from the list, the client device also re-encrypts and shuffles the file list before returning the list to the storage server for re-committal. Thus, the client only obtains the requested file (because the other files are encrypted with keys unavailable to the client). Further, the server does not know which file was accessed because the file list was shuffled and re-encrypted, meaning that every file in the list has changed from the point of view of the storage sever. Further, access patterns are hidden through subsequent access requests for the same file because, due to the shuffling, the file moves around the data structure and the storage server is unaware that the same file is, in fact, being accessed multiple times.

Figure 1:
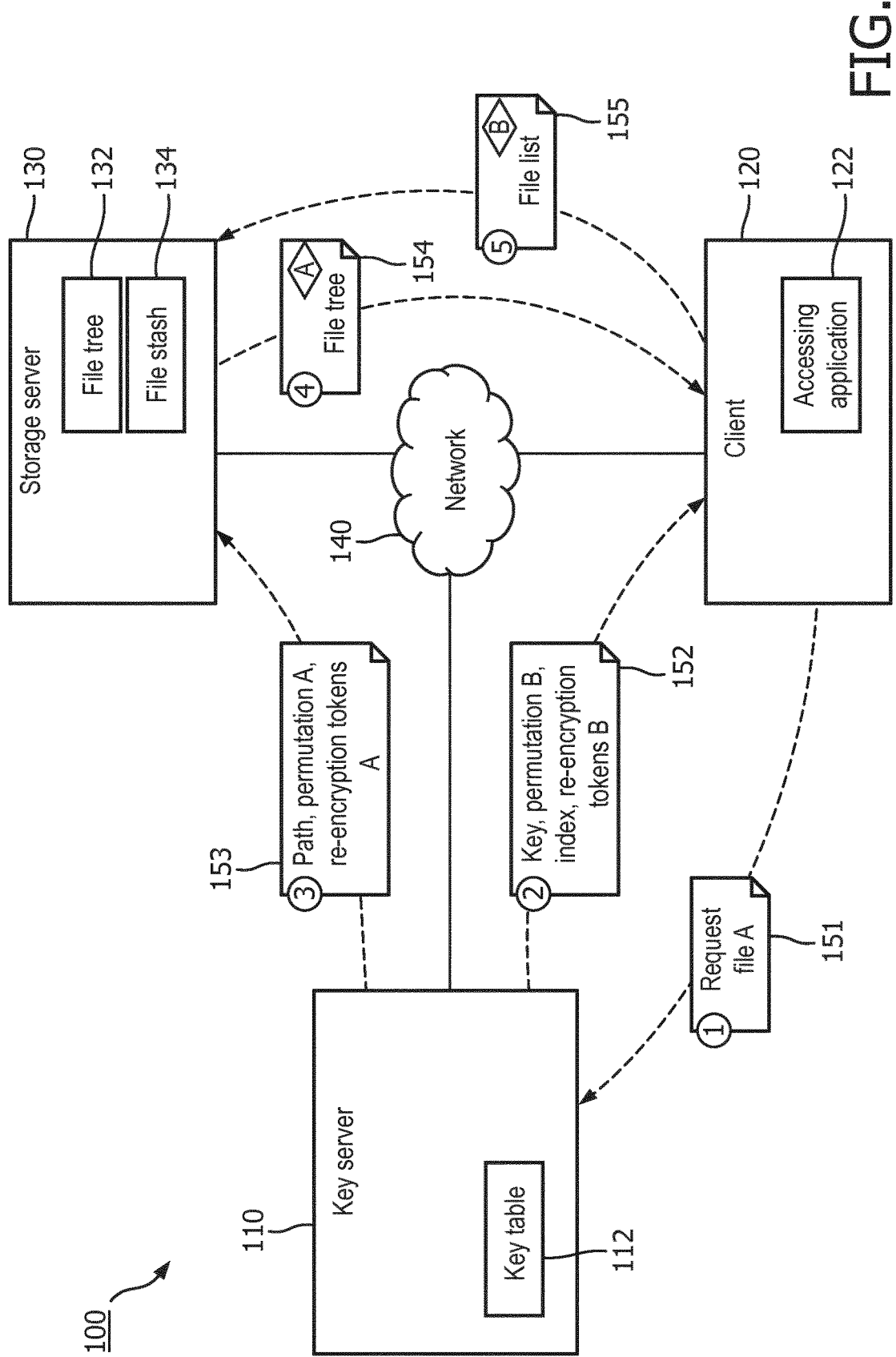
FIG. 1 illustrates an example of a network environment for providing oblivious outsourcing of file storage.

FIG. 1 illustrates an example of a network environment 100 for providing oblivious outsourcing of file storage. As shown, the environment 100 includes a key server 110, a client 120, and a storage server 130 in communication via a network 140 which may include, for example, a carrier network (e.g., 3G or LTE), local area network (LAN) (e.g., Ethernet or WiFi), cloud infrastructure network, or the Internet. The three devices 110, 120, 130 may each be any of various types of devices such as, for example, a personal computer, a server blade, a tablet, a smart phone, a set-top box, a game console, etc. Further, one or more of these device 110, 120, 130 may be implemented as a virtual machine (VM) hosted in one or more cloud computing environments. In some embodiments, additional clients (not shown) may also coordinate with the key server 110 and storage server 130 to access files, thereby providing a multi-user storage system. Further, in some embodiments, additional key servers or storage servers (not shown) may be included to provide redundancy, geographic distribution, load balancing, data replication, additional storage, or other benefits.

As shown, the client includes an accessing application 122 that wishes to access one or more files stored by the storage server 130. This application may be virtually any application capable of reading or writing data such as, for example a word processor or other office productivity software, web browser, a media (e.g., audio or video) player, or an operating system (e.g., where the file to be accessed is software to be executed). As used herein, the term "file" will be understood to encompass virtually any set of data, code, or other digital information that is to be accessed as a unit.

To request a desired file, File A, the client 120 transmits a request 151 to the key server 110, identifying the file by its file name. In various alternative embodiments, other identifiers (or groupings thereof) other than a file name may be used to identify the requested file. In other embodiments, the client 120 may not identify a specific file and, instead, may provide the key server with criteria for selecting an appropriate file or may simply request that any file be provided. For example, in some embodiments, the files stored by the storage server may simply include differing sizes of random data. In such an embodiment, the client may request a file that is at least 1 MB of random data. Various approaches for the key server 110 to select an appropriate file to be served will be apparent.

The key server 110 includes a key table 112 that tracks the locations, encryption keys, and other information regarding various files stored at the storage server. Upon receiving the request 151, the key server locates the entry in the key table 112 for File A and identifies the location of that file in the storage server 130. Specifically, in some embodiments including the embodiment of the present example, the file may be located within a grouping of files (e.g., a tree path as will be described in greater detail below). The key server 110 then generates two permutations for shuffling the grouping of files and two sets of re-encryption tokens for re-encrypting each of the files in the grouping of files. The key server determines the final state of the grouping of files after application of the permutations or re-encryption tokens and updates the records in the key table, e.g., to reflect any new positions of files or new encryption keys to decrypt the respective files.

The key server 110 responds to the client with an instruction message 152 specifying the permutation B and re-encryption tokens B to be applied to the received grouping of files (in this example, a file list). The instruction message also includes a key for decrypting the requested file and an index for locating the requested file within the file list. For example, the key and index may be (or be based on) the key and location recorded for the requested file into the key table 112 after application of both permutations and re-encryptions. This may be appropriate, for example, where the client will shuffle and re-encrypt the file list before accessing the requested file. Alternatively, in embodiments, where the client 120 will access the requested file before shuffling and re-encrypting the file list, the key server 110 will first determine the index and key that will correspond to the file after application of only the first permutation and re-encryption by the storage server. Various other points for accessing the file and an appropriate key-index pair will be apparent (e.g., after both shuffles but only the storage-side re-encryption).

The storage server 130 includes a data structure for storing multiple files for access by one or more clients 120. As illustrated, this data structure includes a file tree 132 and a file stash 134. Between these two elements, various groupings of files may be stored. In some embodiments, these groupings may overlap and some files may belong to multiple groupings. For example, according to various embodiments, each grouping may be defined as all files that are located between the root node and a specified leaf node plus the files in the file stash. To initiate file transfer, the key server transmits an instruction message 153 including the permutation A and re-encryption tokens A to be applied to the file list, along with an identification of a path to be used in retrieving the appropriate files within the file list. Various other information for inclusion in the instruction message 153 will be apparent such as, for example, an identification of the client 120 (e.g., an IP address) to enable the storage server to directly transmit the file list to the appropriate client 120. Alternatively, this instruction message (or the information contained therein) may be sent as part of or along with the instruction message 152 sent to the client which may, in turn, forward the storage server instruction information along to the storage server. In some such embodiments, the instruction message 153 (or information contained therein) may be encrypted based on a key known to the storage server 130 but not the client 120.

Upon receiving the instruction message 153, the storage server obtains the files on the identified path, applies the permutation by shuffling the resulting list, re-encrypts the files in the file list according to the re-encryption tokens, and transmits the file list 154. The client device may then retrieve and decrypt the requested file, make any desired edits if writing is permitted, apply the permutation, and re-encrypt the files in the file list. The client 120 may then transmit the file list 155 back to the storage server to be inserted back into the data structure(s) 132, 134 in the fully shuffled and re-encrypted form anticipated by the key server. As such, the state of the files in the data structure 132, 134 will match the key table 112 (e.g., in terms of file positions or encryption keys).

Figure 2:
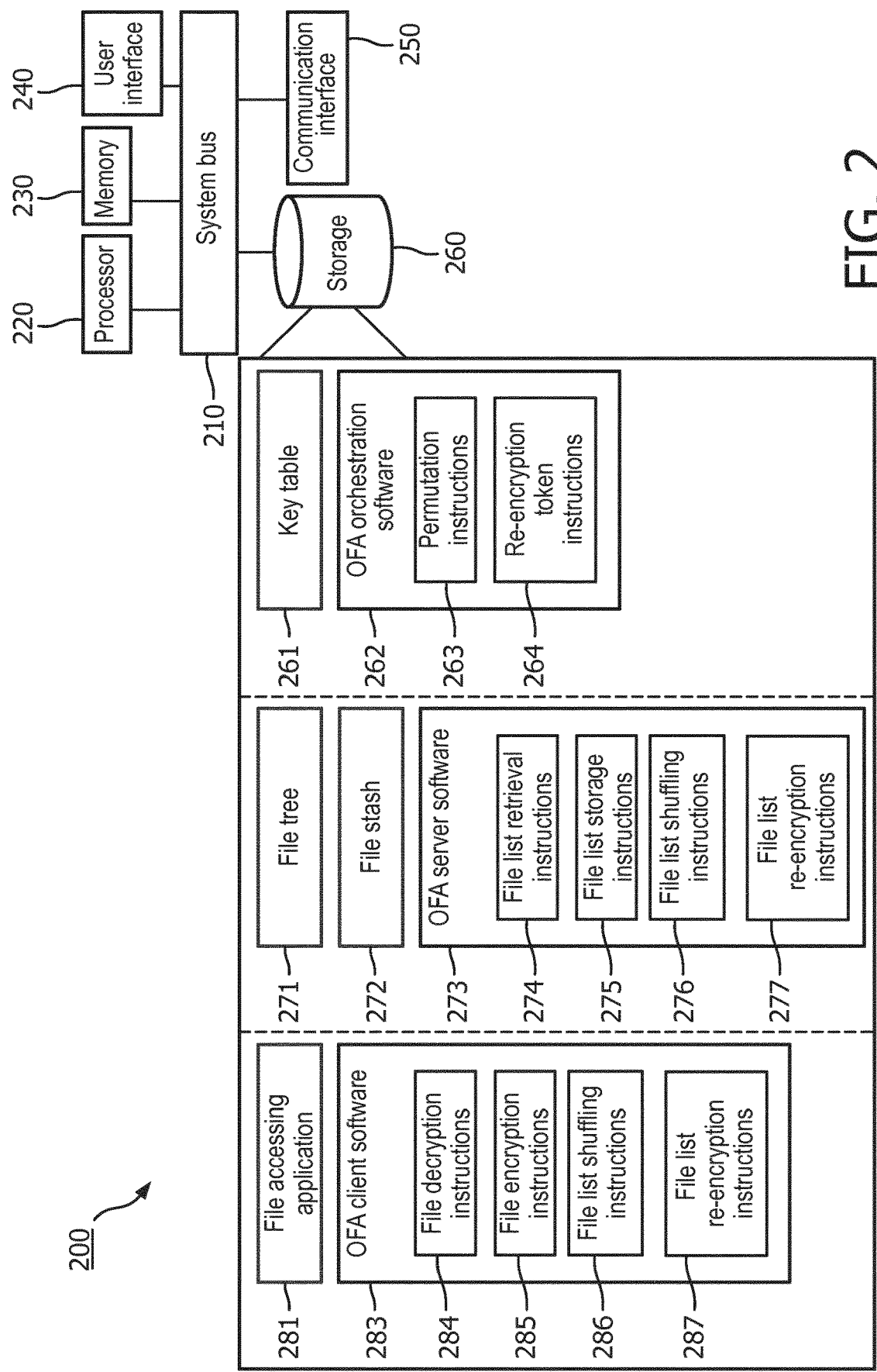
FIG. 2 illustrates an example of a hardware system for implementing a key server, storage server, or client device.

FIG. 2 illustrates an example of a hardware system 200 for implementing a key server, storage server, or client device. The hardware 200 may correspond to the key server 110, client device 120, or storage server 130 of FIG. 1. As shown, the device 200 includes a processor 220, memory 230, user interface 240, communication interface 250, and storage 260 interconnected via one or more system buses 210. It will be understood that FIG. 2 constitutes, in some respects, an abstraction and that the actual organization of the components of the device 200 may be more complex than illustrated.

The processor 220 may be any hardware device capable of executing instructions stored in memory 230 or storage 260 or otherwise processing data. As such, the processor may include a microprocessor, field programmable gate array (FPGA), application-specific integrated circuit (ASIC), or other similar devices.

The memory 230 may include various memories such as, for example L1, L2, or L3 cache or system memory. As such, the memory 230 may include static random access memory (SRAM), dynamic RAM (DRAM), flash memory, read only memory (ROM), or other similar memory devices. It will be apparent that, in embodiments where the processor includes one or more ASICs (or other processing devices) that implement one or more of the functions described herein in hardware, the software described as corresponding to such functionality in other embodiments may be omitted.

The user interface 240 may include one or more devices for enabling communication with a user such as an administrator. For example, the user interface 240 may include a display, a mouse, and a keyboard for receiving user commands. In some embodiments, the user interface 240 may include a command line interface or graphical user interface that may be presented to a remote terminal via the communication interface 250.

The communication interface 250 may include one or more devices for enabling communication with other hardware devices. For example, the communication interface 250 may include a network interface card (NIC) configured to communicate according to the Ethernet protocol. Additionally, the communication interface 250 may implement a TCP/IP stack for communication according to the TCP/IP protocols. Various alternative or additional hardware or configurations for the communication interface 250 will be apparent.

The storage 260 may include one or more machine-readable storage media such as read-only memory (ROM), random-access memory (RAM), magnetic disk storage media, optical storage media, flash-memory devices, or similar storage media. In various embodiments, the storage 260 may store instructions for execution by the processor 220 or data upon with the processor 220 may operate. For example, the storage 260 may store a base operating system (not shown) for controlling various basic operations of the hardware 200.

For example, where the hardware 200 implements a key server, such as the key server 110 of FIG. 1, the storage 260 may store a key table 261 and oblivious file access (OFA) orchestration instructions 262 for instructing a client and storage server in how to achieve a file access according to the approaches detailed herein. In various embodiments, the OFA orchestration software 262 includes permutation instructions 263 for determining and defining how one or more devices should shuffle a grouping of files or re-encryption token instructions 264 for generating one or more re-encryption tokens to be applied by one or more devices to one or more files within a grouping of files.

Where the hardware implements a storage server, such as the storage server 130 of FIG. 1, the storage 260 may include a data structure for storing a plurality of files such as, as illustrated, a file tree 271 and a file stash 272, examples of which will be explained below with reference to FIG. 3. Further, the storage may include OFA server software 273 for providing access to files stored in the data structure and performing obfuscation operations as instructed by a key server. As such, the OFA server software 273 may include file list retrieval instructions 274 and file list storage instructions 275 for retrieving and placing groupings of files in the data structure, respectively. The OFA server software 273 may also include file list shuffling instructions 276 for shuffling a file list as instructed by the key server or file list re-encryption instructions 277 for re-encrypting files in within the file list as instructed by the key server.

Where the hardware implements a client device, such as the client device 120 of FIG. 1, the storage 260 may include a file-accessing application 281 that desires to access the file (e.g., a word processor, media player, etc.). The storage 260 may also include OFA client software for accessing a file requested by the application 281 as directed by the key server (e.g., upon the OFA client software 283 transmitting a file request to the key server). As such, the OFA client software 283 may include file decryption instructions 284 for decrypting the requested file when a file list has been received from the storage server and file encrypting instructions 285 for encrypting a modified version of the requested file to be transmitted back to the storage server. The OFA client software 283 may also include file list shuffling instructions 286 for shuffling a file list as instructed by the key server or file list re-encryption instructions 287 for re-encrypting files within the file list as instructed by the key server.

It will be apparent that various information described as stored in the storage 260 may be additionally or alternatively stored in the memory 230. In this respect, the memory 230 may also be considered to constitute a "storage device" and the storage 260 may be considered a "memory." Various other arrangements will be apparent. Further, the memory 230 and storage 260 may both be considered to be "non-transitory machine-readable media." As used herein, the term "non-transitory" will be understood to exclude transitory signals but to include all forms of storage, including both volatile and non-volatile memories.

While the hardware device 200 is shown as including one of each described component, the various components may be duplicated in various embodiments. For example, the processor 220 may include multiple microprocessors that are configured to independently execute the methods described herein or are configured to perform steps or subroutines of the methods described herein such that the multiple processors cooperate to achieve the functionality described herein. Further, where the device 200 is implemented in a cloud computing system, the various hardware components may belong to separate physical systems. For example, the processor 220 may include a first processor in a first server and a second processor in a second server.

Figure 3:
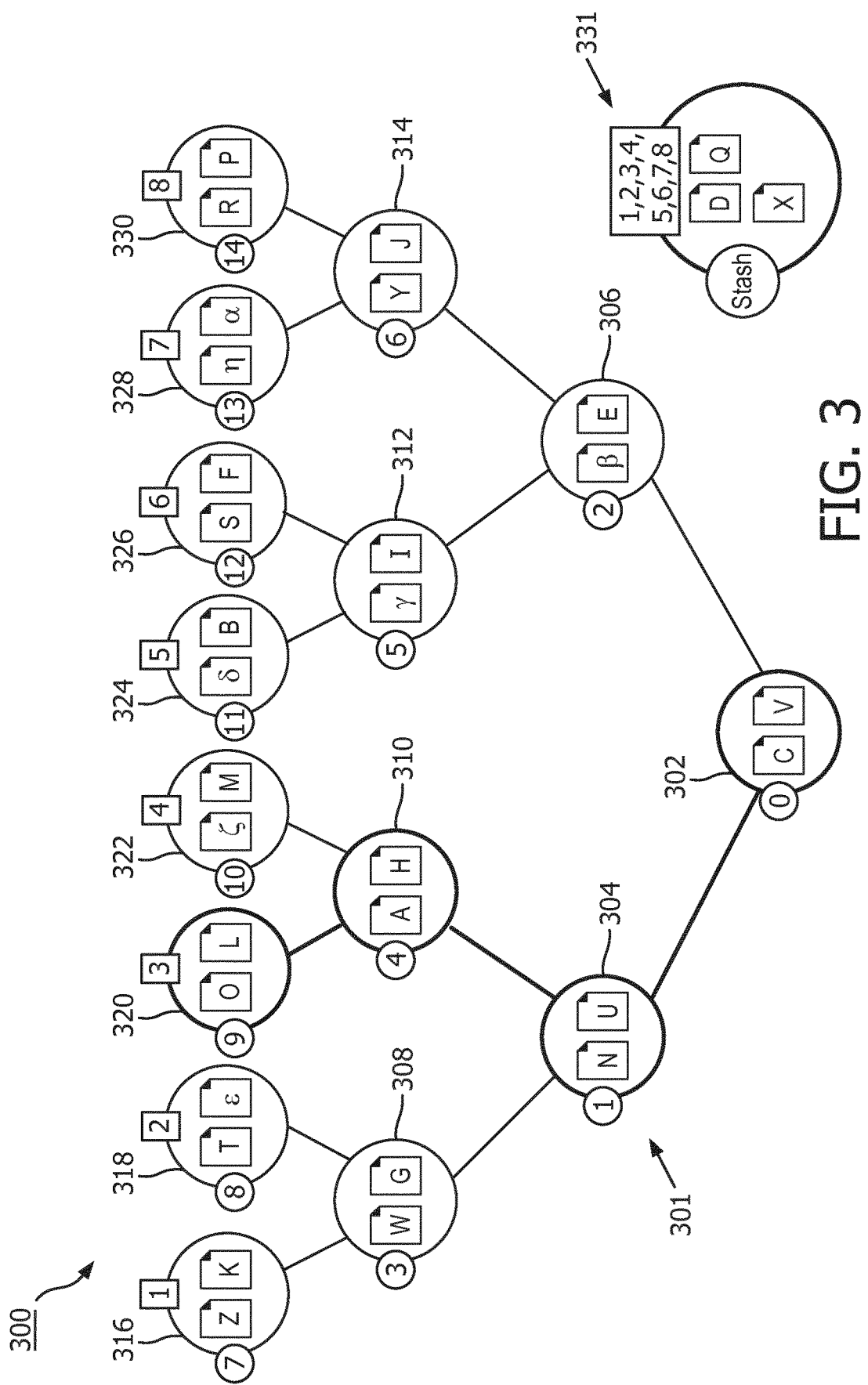
FIG. 3 illustrates an example of a data structure for storing a group of files.

FIG. 3 illustrates an example of a data structure 300 for storing a group of files at a storage server such as the storage server 130 of FIG. 1. As shown, the data structure 300 is in the form of a binary tree 301 and stash 331 and may correspond to the file tree 132 and stash 134 of FIG. 1, respectively, or the file tree 271 and stash 272 of FIG. 2, respectively. Various alternative data structures for storing groupings of files (in some embodiments, overlapping groupings of files) will be apparent and modifications to the methods and systems described herein to support such alternative data structures will be apparent.

As shown, the binary tree 301 includes 15 nodes 302-330 distributed between four tree levels. Each node holds a number of files up to a maximum limit of files per node. For example, as shown, each node has a maximum of 2 files per node; as such, each node 302-330 may store zero, one, or two files. Various alternative embodiments may include different maximum files per node. For example, in some embodiments, each node may store up to 4 files while, in other embodiments, each node may store only one file. In some embodiments, where a node includes fewer than the maximum number of files per node, "dummy" files may be inserted into the node up to the maximum limit and later deleted when room is needed on the node to store an additional true file. In various embodiments, the files stored within the data structure 300 are encrypted. In some such embodiments, each file is individually encrypted with a different encryption key that is unknown to the storage server that stores the data structure 300.

In addition to the tree 301, the data structure 300 includes a stash 331 to act as an overflow space for files that cannot be placed on the tree 301 (e.g., because the tree or a portion of the tree assigned to the file is already full or otherwise cannot receive the file). The stash 331 is pictured as a separate node apart from the tree. Various structures for realizing the stash 331 will be apparent such as, for example, a list or table. In various embodiments, no limit is placed on the stash of how many files may be stored therein.

The tree 301 includes 8 leaf nodes 316-330 (i.e., nodes without any children nodes). Groupings of the files can be defined in terms of these leaf nodes 316-300. Specifically, each leaf node 316-330 is associated with a different path from the root node 312 to that leaf node 316-330. For example, as shown in bold, path 3 includes the root node 302, node 1 304, node 4 310, node 9 320, and the stash 331. As such, this path 3 constitutes a grouping of files stored in the data structure 300. As can be seen, together, the eight paths 1-8 each constitute groupings of files and any given file of the data structure 300 must fall into at least one such grouping. Because some files (e.g., the files at the root node 302, files at the level 1 nodes 304, 306, files at the level 2 nodes 308, 310, 312, 314, and files in the stash 331) may belong to multiple such groupings at the same time, the groupings are said to be overlapping. Further, the groupings may be considered ordered because their order in a list (e g., a file list extracted from the structure 300 as detailed below) may correspond to their position in the structure (e.g., the first two files in a file list corresponding to a path may belong in the leaf node of that path).

Figure 4:
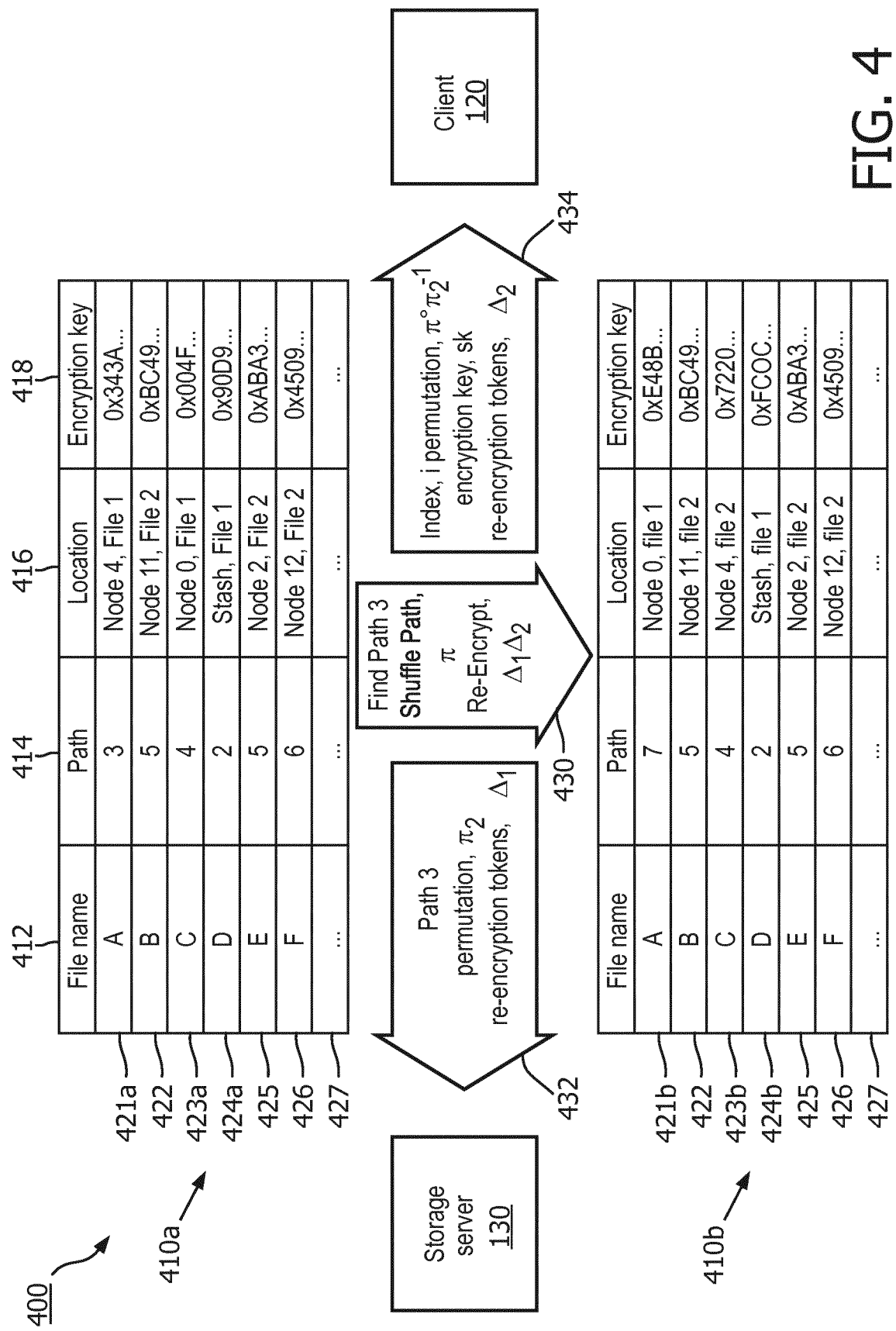
FIG. 4 illustrates examples of a data structure for storing a key table and a method for facilitating access to a file on a storage server.

FIG. 4 illustrates examples of a data structure 400 for storing a key table and a method for facilitating access to a file on a storage server. As shown, two instances of the key table 410a, 410b at two different points in time are illustrated. The key table 410a, b may correspond to the key table 112 of FIG. 1 or the key table 261 of FIG. 2. In various embodiments, the key table 410a, b may be stored and operated on by a key server such as the key server 110 of FIG. 1. FIG. 4 also illustrates multiple intermediate operations 430, 432, 434 performed by the key server to orchestrate a file access that also transform the initial key table 410a into the subsequent version of the key table 410b.

The key table 410a reflects the key server's knowledge of the data structure of the storage server, e.g., the tree 301 and stash 331 illustrated in FIG. 3. As shown, the key table 410a includes multiple fields including a file name field 412 for uniquely identifying each file by name (or other appropriate identifier), a path field 414 for identifying a path (or other grouping of files) to which each file belongs, a location field 416 for identifying precisely in the data structure where each file may be found, and an encryption key field 418 for storing a key that may be used to decrypt each file. In various embodiments, the actual key that will be used by the client to decrypt the file may be derived from the key stored in field 418 (e.g., based on one or more re-encryption tokens); as the key actually maintained by the key server, the key in the field 418 may be referred to as the master encryption key. Various additional or alternative information for inclusion in the key table 410a will be apparent such as, for example, a list of users with permission to access each file for use in authenticating a client device before orchestrating the file access as described herein. In some embodiments, fewer fields may be included in the key table 410a; for example, the path field 414 may be omitted. In such embodiments, the key server may derive the path value from the location value when the path is needed. For example, a lookup table may be useful to correlate each node to an appropriate path for accessing.

As an example, a first key entry 421a indicates that file "A" is located on path 3 as the first file on node 4 of the tree. An encryption key of "0x343A . . . " can be used to decrypt this file "A." As can be seen by referring back to FIG. 3, the file "A" is indeed located on path 3 at node 4; however, file "A" is also located on path 4. Even though the file may be accessible via multiple paths, the path field 414 in this embodiment only records a single path for accessing the file; it will be appreciated that the selection of a single path for recording is sufficient for file access and, in some embodiments, facilitates movement of the file around the tree (by reducing constraints on file relocation, as will be described below). The remaining entries 422, 423a, 424a, 425, 426 describe similar information for files "B," "C," "D," "E," and "F," respectively. As will be seen, this information generally reflects the positions of these files within the data structure 300 of FIG. 3. Numerous additional records 427 may describe the remaining files pictured in the data structure 300 of FIG. 3.

Upon receiving a client request for file "A," the key server begins to facilitate the file access by first transforming the key table and determining instructions to the storage server and client to similarly transform the data structure 430. In particular, as will be described in greater detail below, the key server determines from entry 421a that the requested file "A" is on path 3, shuffles the order of the files within the path 3 based on a permutation $\pi$ including assigning the requested file "A" to a new path, and determines new encryption keys for each file on the path based on two sets of re-encryption keys $\Delta_1$, $\Delta_2$. Various methods of obtaining a new encryption key based on an old encryption key and one or more re-encryption tokens will be apparent. Thus, the resulting key table 410b includes three updated entries 421b, 423b, 424b corresponding to files "A," "C," and "D," the files that exist on path 3 as seen in FIG. 3. The entry for the requested file "A" 421b includes a new path (path 7), a new location (Node 0, File 1, which is located on both the old path 3 and the new path 7), and a new encryption key (0xE48B). The other two modified entries 423b, 424b also are updated to include new encryption keys. Further entry 423b includes a new location for File "C;" Entry 424b shows that file "D" did not move. It will be apparent that entries for other files (e.g., files "V" and "N") on path 3 not pictured in FIG. 4 will be similarly updated. The remaining entries (i.e., entries for files that do not exist on path 3 currently) are unchanged.

To effect changes to the data structure held by the storage server to reflect the changes to the key table (e g., shuffling and re-encryption of files) along with the requested file access, the key server sends instructions 432 to the storage server 130 and instructions 434 to the client 120 to orchestrate the file access. For example, to perform the file access alone, the key server indicates to the storage server that path 3 should be transmitted to the client 120 and indicates to the client that it should use key sk (which may be key "0x343A . . . ," "0xE48B . . . ," or another intermediate key, depending on which of the devices 120, 130 will re-encrypt the file and when the decryption will occur in relation thereto) to decrypt the $i^{th}$ file (as determined based on the file's location at node 4, file 1; at node 0, file 1, or another intermediate location depending on which of the devices 120, 130 will shuffle the file list and when the decryption will occur in relation thereto) in the received file list. This encryption key may be formed according to various approaches. For example, the key may be a symmetric key, that is, the same key is used for encryption and decryption (notwithstanding the symmetric key proxy-re-encryption operations which serve to change the symmetric key between encryption and decryption operations). In other embodiments, an asymmetric encryption key may be used. In such an embodiment, sk may be a public key used for encryption or a private key used for decryption, depending on the context of the operation being performed. Re-encryption may then be performed, e.g., using normal proxy re-encryption.

To facilitate shuffling, the key server instructs the storage server 130 to shuffle the file list according to a different permutation $\pi_2$ than the one applied to the files in the key table. The key server also instructs the client 120 to shuffle the file list according to a permutation $\pi \circ \pi_2^{-1}$ before sending the file list back to the storage server 130 to be added back into the data structure. Thus, the files will end up shuffled according to $\pi$ as in the key table 410b even though neither of the other device 120, 130 were given the true permutation $\pi$.

To facilitate re-encryption, each of the other two devices 120, 130 are given one of the sets of re-encryption tokens $\Delta_1$, $\Delta_2$ to be applied to the files within the file list before being committed back to the data structure at the storage server 130. Thus, neither party 120, 130 is given any of the keys for decrypting the files (except for the key sk for decrypting the requested file which, in some embodiments, may not be the final encryption key for the version of the requested file that is committed back to the data structure).

Figure 5:
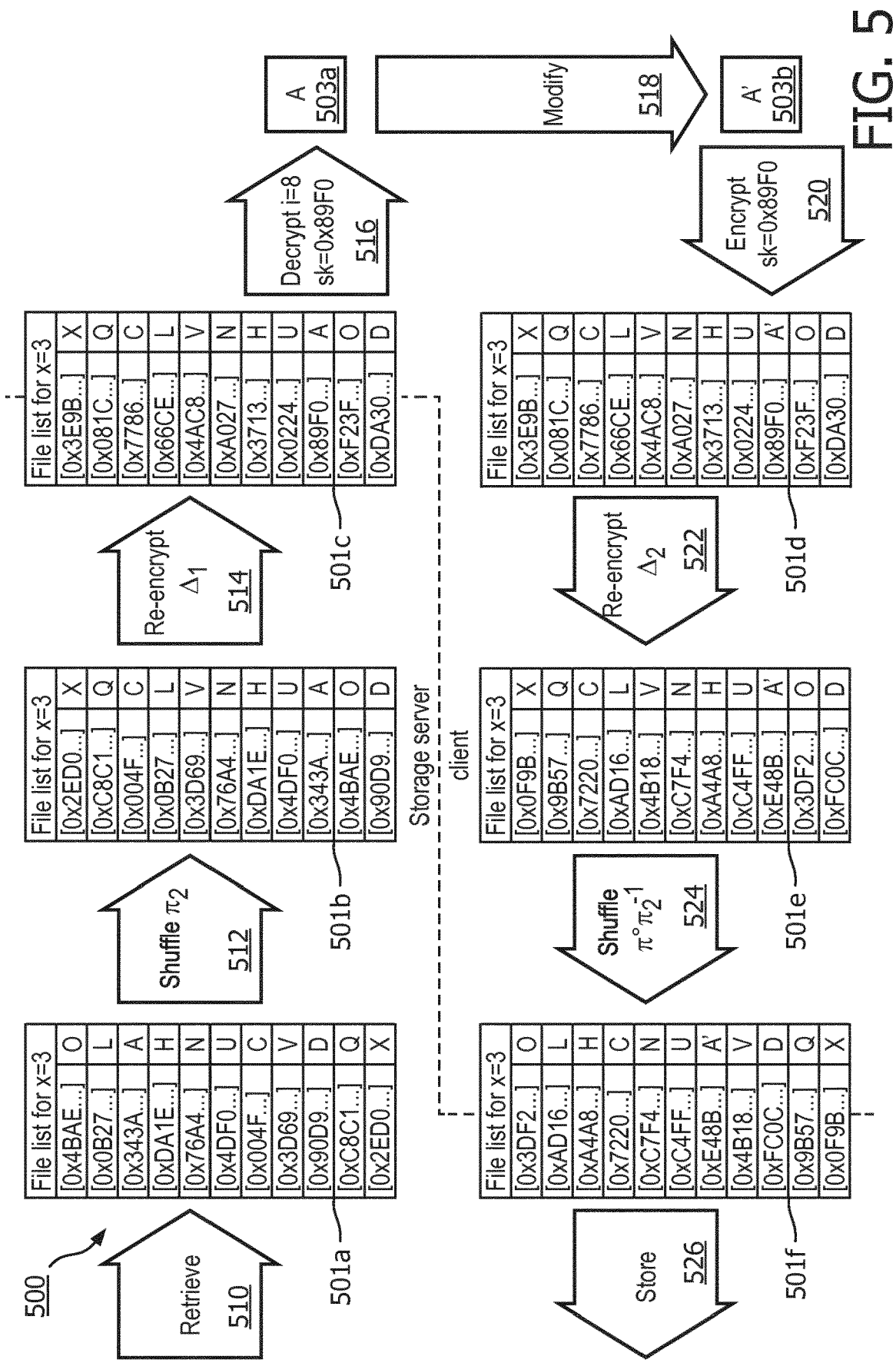
FIG. 5 illustrates an example of operations performed on a file list for enabling access to a file.

FIG. 5 illustrates an example of operations 500 performed on a file list for enabling access to a file. These operations 500 may be performed by the storage server 130 and client 120 of FIG. 1 based on instructions (e.g., instructions 432, 434 of FIG. 4) received from the key server.

The operations 500 begin by retrieving 510 a file list 501a from the data structure stored at the storage server corresponding to the path indicated by the key server. As shown, the file list 501a corresponds to path 3 of the data structure 300 of FIG. 3. In this particular example, the file list 501a is ordered based on the arrangement of the files within the tree 301 and stash 331: the first two files, "O" and "L;" are in the leaf node 320 for path 3; the next two files, "A" and "H," are in the next node up 310; the next two files, "N" and "U," are in the next node up 304; the next two files, "C" and "V," are in the root node 302; and the remaining files, "D" "Q" and "X," are in the stash 331.

Next, the storage server shuffles 512 the file list 501a to produce a reordered file list 501b based on the permutation $\pi_2$ received from the key server. This shuffling may appear to be a random reordering because, in various embodiments, $\pi_2$ may be chosen randomly by the key server. The storage server then re-encrypts 514 the file list 501b using the re-encryption tokens $\Delta_1$ received from the key server. Various techniques for re-encryption (i.e., changing the encryption key of an encrypted file without first decrypting the file) will be apparent. In various embodiments, the set of re-encryption tokens $\Delta_1$ may include a different re-encryption token to be applied to each file, though various modifications are possible (e.g., only a single re-encryption token may be used to re-encrypt all of the files). The resulting file list 501c may then be transmitted to the client device.

To access the requested file, the client accesses the file at the position within the list identified by the key server (here, identified as i=8 by the key server) and decrypts the file using the encryption key provided by the key server (here, sk=0x89F0 . . . ). The client performs any modifications 518 on the decrypted file 503a to produce the modified file 503b desired to be stored at the storage server. The modified file 503b is then encrypted using the same key sk (or, in the case of asymmetric encryption, a different public key) and inserted back into the file list at the same position i. Alternatively, if no modification to the file is to be performed, steps 518, 520 may be omitted.

To commit the file list 501d (potentially including a modified version of the requested file) back to the storage server, the client first re-encrypts 522 the files in the file list according to the set of re-encryption tokens $\Delta_2$ received from the key server to produce another version of the file list 501e. Now that both sets of re-encryption tokens $\Delta_1$, $\Delta_2$ have been applied to the files, the encryption states now reflect the encryption keys recorded in the key table 410b.

Continuing on, the client shuffles 524 the file list 501e according to the permutation $\pi \circ \pi_2^{-1}$ received from the key server to produce a shuffled file list 501f. Thus, the client simultaneously rolls back the shuffling 512 performed by the storage server and applies the true permutation $\pi$ selected by the key server and reflected in the key table 410b. The client then sends the file list 501f back to the storage server for storage 526 according to the ordering principles previously described (or other ordering principles consistent with alternative embodiments). Thus, the contents of the data structure have been updated by obfuscation operations performed between the storage server and the client to follow the changes made to the key table 410b.

It will be apparent that this order of operations is merely one example of obfuscation operations to be performed in an oblivious access system. Various alternatives will be apparent. For example, in some embodiments, steps 512, 524 may be omitted (along with analogous operations on the key table 410b) such that no shuffling is performed. Similarly, in some embodiments, steps 514, 522 may be omitted (along with analogous operations on the key table 410b) such that no re-encryption is performed. In some embodiments step 512 or step 524 may be omitted such that only one device shuffles the list; in some embodiments step 514 or 522 may be omitted such that only one device re-encrypts the files in the list. In some embodiments, the order of these operations may be switched: step 514 may be performed before step 512, step 522 may be performed after step 524, or step 516 may be performed after step 522 or step 524. Various alternative and additional obfuscating operations may also be used other than shuffling and re-encryption.

Figure 6:
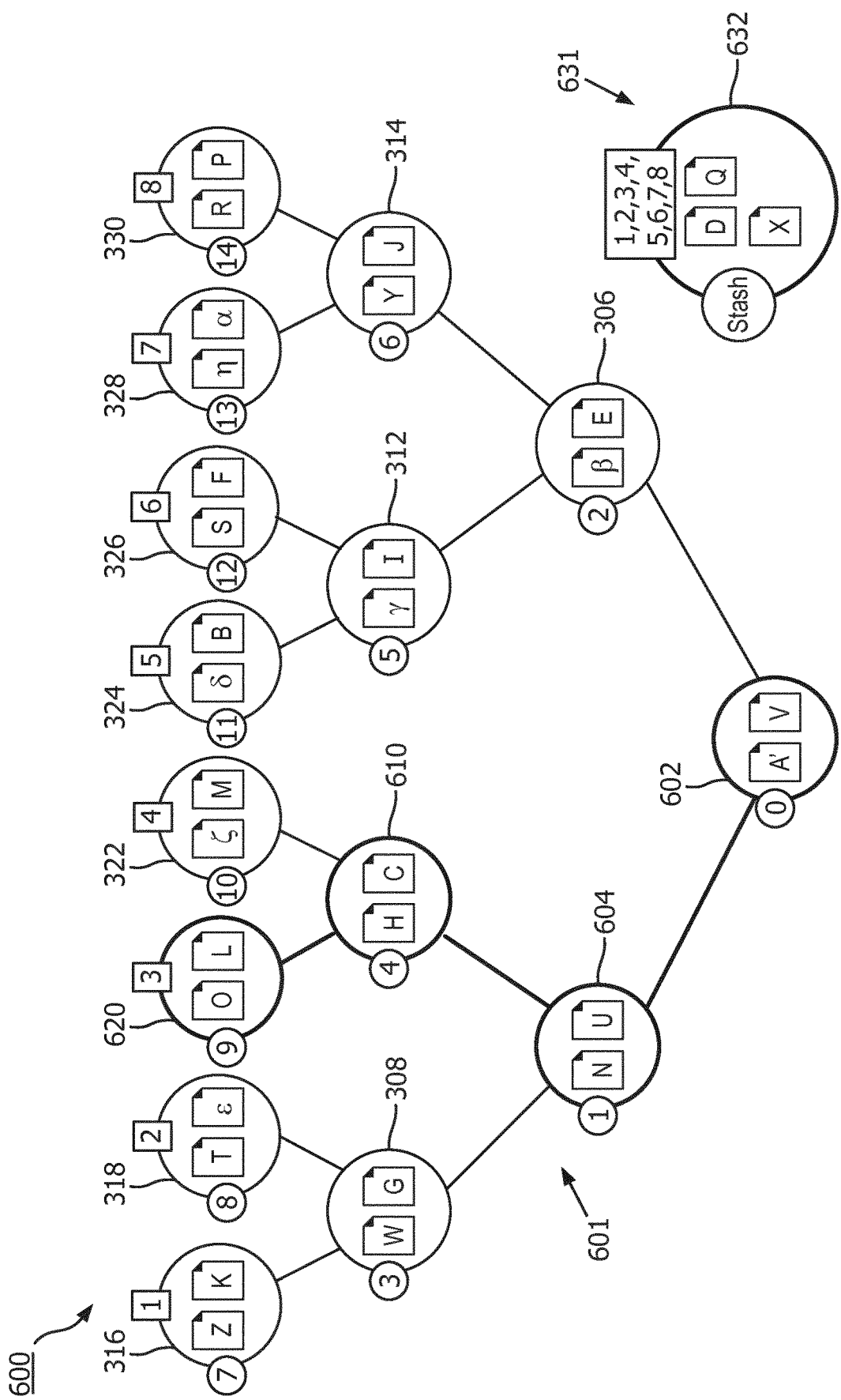
FIG. 6 illustrates another example of a data structure for storing a group of files.

FIG. 6 illustrates another example of a data structure 600 for storing a group of files. In particular, the data structure 600 may correspond to the data structure 300 of FIG. 3 at a point in time following performance of the operations 500 of FIG. 5 and, therefore, may reflect the state of the key table 410b.

As shown, the final file list 501f has been placed back in path 3 of the data structure 600. Additionally, the ordering correspondence between the file list and the path 3 has remained consistent between the access and storage operations: the first two files, "O" and "L;" are in the leaf node 620 for path 3 on the tree 601; the next two files, "H" and "C," are in the next node up 610; the next two files, "N" and "U," are in the next node up 604; the next two files, "A'" and "V," are in the root node 602; and the remaining files, "D" "Q" and "X," are in the stash 631. Thus, on the next access operation, the files will be located in the correct spots as anticipated by the current key table 410*b* and the methods described herein may be repeated.

Figure 7:
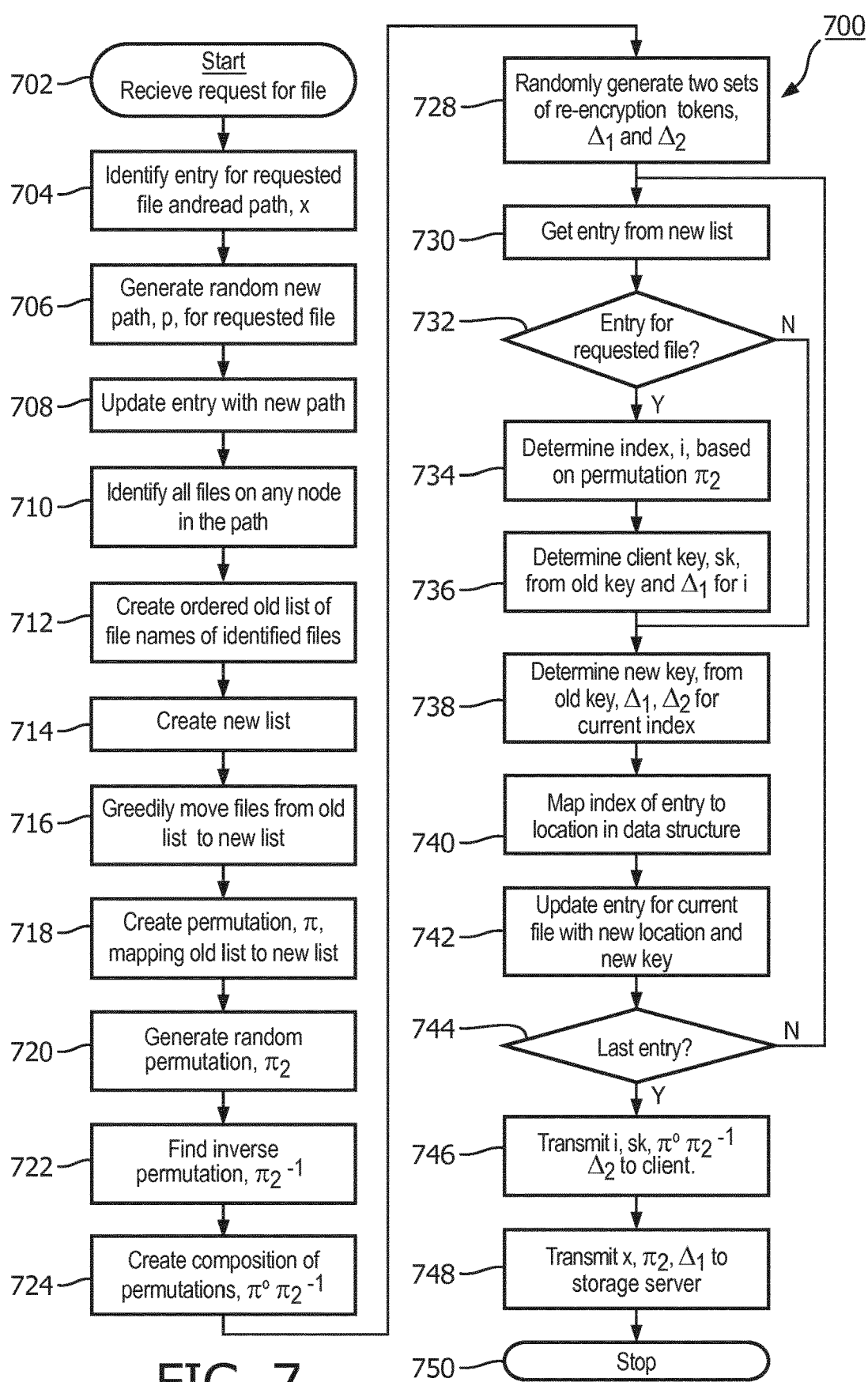
FIG. 7 illustrates an example of a method performed by a key server for facilitating file access.

FIG. 7 illustrates an example of a method 700 performed by a key server, such as the key server 110 of FIG. 1, for facilitating file access. In various embodiments, the method 700 may correspond to some of the operations 430, 432, 434 described in relation to FIG. 4. In some embodiments, the method 700 may be performed by the OFA orchestration software 262 of FIG. 2. Various modifications to the method 700 in view of various alternative embodiments, such as those described herein, will be apparent (e.g., the steps may be modified such that the outputs of steps 734 or 736 take into account not only the obfuscation operations that will be performed by the storage server, but also those that will be performed by the client). It will be apparent that the method 700 (as well as the other methods 800-1100 described herein) is merely an example of how the functionality described herein may be implemented and that other implementations are possible within the scope of the present disclosure.

The method starts in step 702 in response to, for example, the key server receiving a request for a file. The request may be received from the client or from another device that has directed that a specific file be delivered to the client. The key server proceeds to locate the entry for the requested file in the key table in step 704. From this entry, the key server determines that path, x, to which the file is currently assigned. Next, in step 706, the key server generates a new path, p, (e.g., uniformly at random) to which the file will be assigned after completion of the access operation and, in step 708, records this new path in the key table entry in place of the previous path. In various embodiments, and as will be seen in the example of FIG. 8, the path recorded in the entry will inform the reordering method for the files in the path x, such that simply updating the entry with the new path will result in that method placing the file at a location on the new path.

In step 710, the key server identifies from the key table any files that currently exist on the path, x, and in step 712 creates an ordered old list of these files. Specifically, the key server may select not only those files that are identified as existing on path x, but any file in a location that is literally on that path. This may be accomplished, for example, through use of a lookup table that maps each path to a set of nodes (plus the stash) that belong to that path. This step may be appropriate where the paths are overlapping (e.g., in the case of a binary or other tree) and, as such, each file may exist on multiple paths, not just the path noted in the entry. The order of files within the list may be any predictable order that is to be used for both file access and storage. For example, as described above, the order may start at the leaf node of the path and work through successive parent nodes up to the root node, and then finish with the stash. Other useful orders for extracting a grouping of files from a data structure to a list will be apparent.

In step 714, the key server prepares for finding the final post-access order of the file list by creating an empty list. Next, in step 716, the key server moves files from the old list to the new list in some manner that causes some degree of shuffling. For example, step 716 may employ a greedy placement approach that places each file in the first available position that satisfies the constraint that the file exists on the path to which it is assigned (as reflected by the corresponding key table entry). An example of such a greedy approach will be described in detail with respect to FIG. 8.

In step 718, the key server defines a permutation $\pi$ that defines the mapping of file positions in the old list to the new list. The permutation $\pi$ (and other permutations described herein) may be any suitable data structure such as an associative array that maps each old index to a new index. Thus, if the file at position 1 is to move to position 5, an entry in the array keyed to "1" would return the value "5." Various alternative methods for defining the permutations will be apparent.

In step 720, the key server generates a random permutation, $\pi_2$, to be applied to the file list by the storage server. Next, the key server finds the permutation to be applied by the client by first finding the inverse of the random permutation of step 720. This inverse permutation $\pi_2^{-1}$ may be computed by simply switching the keys and values of the random permutation $\pi_2$ where the permutations are stored in an associative array. Next, the key server composes the final permutation $\pi$ with the inverse permutation $\pi_2^{-1}$ to produce the permutation $\pi \circ \pi_2^{-1}$ to be applied to the file list by the client. This may be accomplished where the permutations are represented in associative arrays by retrieving each value in the final permutation $\pi$, using that "intermediate value" as an index into the inverse permutation $\pi_2^{-1}$ to retrieve a new value, and replacing the intermediate value with the new value. Various other composition approaches will be apparent. It will be understood that, according to this example approach, the storage server and client may together effect application of the final permutation $\pi$ to the file list without either device knowing what the final permutation $\pi$ actually is.

Next, the key server determines the re-encryption tokens to be used in step 728. For example, where each file in the list is to be re-encrypted with different tokens by both storage server and client devices, the key server may generate two sets of re-encryption tokens, $\Delta_1$ and $\Delta_2$, where each set includes the same number of tokens as files in the file list. It will be apparent that in various embodiments different numbers of tokens may be generated; for example, a single token may be generated for each of the client and storage server to be applied to all files, a subset of files, or a single file in the list; a single set of tokens may be generated for application by either the storage server or the client; a single set of tokens may be generated and split between the storage server or the client for application to respective files, etc. In various embodiments, the tokens may be generated uniformly at random, or simply at random.

Having generated the tokens $\Delta_1$ and $\Delta_2$, the key server begins to iterate through the files in the list to determine the new encryption keys that will result from application of the re-encryption tokens. In step 730, the key server gets an entry from the new list and, in step 732, determines whether this entry corresponds to the requested file. If so, the key server proceeds to determine the index and decryption key that will be used by the client to access to the file. For example, in step 734, the key server may determine the index, i, of the file in the file list after application of the random permutation $\pi_2$ to the old list. Then, in step 734, the key server may determine the encryption key, sk, that will be the result of application of the first set of re-encryption tokens $\Delta_1$ (but not the second set). Various techniques for translating an old key (as stored in the key table entry for the requested file) to a new key based on a re-encryption token will be apparent. Thus, steps 734, 736 identify the index and key for the requested file after the storage server has shuffled and re-encrypted the file list, but before the client has done the same. Modifications for embodiments wherein the client does not access the requested file from the list until after it too shuffles and re-encrypts the list will be apparent. For example, an index of the file within the new list and the encryption key resulting from application of step 738 (described below) may instead be provided to the client.

In step 738, the key server determines the new encryption key that will decrypt the current file (whether the requested file or another file in the path thereof) after application of both sets of re-encryption tokens $\Delta_1$ and $\Delta_2$. Again, various techniques for translating an old key (as stored in the key table entry for the current file) to a new key based on re-encryption tokens will be apparent. Next, in step 740, the key server maps the index of the current file to the new location within the data structure (e.g., on the tree or in the stash). Such mapping may be performed in some embodiments using a lookup table. For example, a different lookup table may be defined for each path and each such lookup table may map an index to a node and file position. After determining the new key and location, the key server stores this new information in the entry for the current file.

In step 744, the key server determines whether all files in the list have been analyzed in view of the permutations and re-encryptions to be performed as part of the file access. If additional files remain, the method 700 loops back to step 730 to consider the next file in the list. Otherwise, having fully updated the key table to reflect the final state of the data structure after the file access is performed, the key server proceeds to instruct the client and storage server on how to achieve the file access. In step 746, the key server transmits the requested file index, i, requested file encryption key, sk, client permutation $\pi \circ \pi_2^{-1}$, and client re-encryption tokens, $\Delta_2$ to the client. Then, in step 748, the key server transmits the path, x, the storage server permutation $\pi_2$, and storage server re-encryption tokens $\Delta_1$ to the storage server. The method 700 proceeds to end in step 750, as the storage server and client conduct the file access as requested, for example according to one of more of the example methods described below with respect to FIGS. 9-11.

Figure 8:
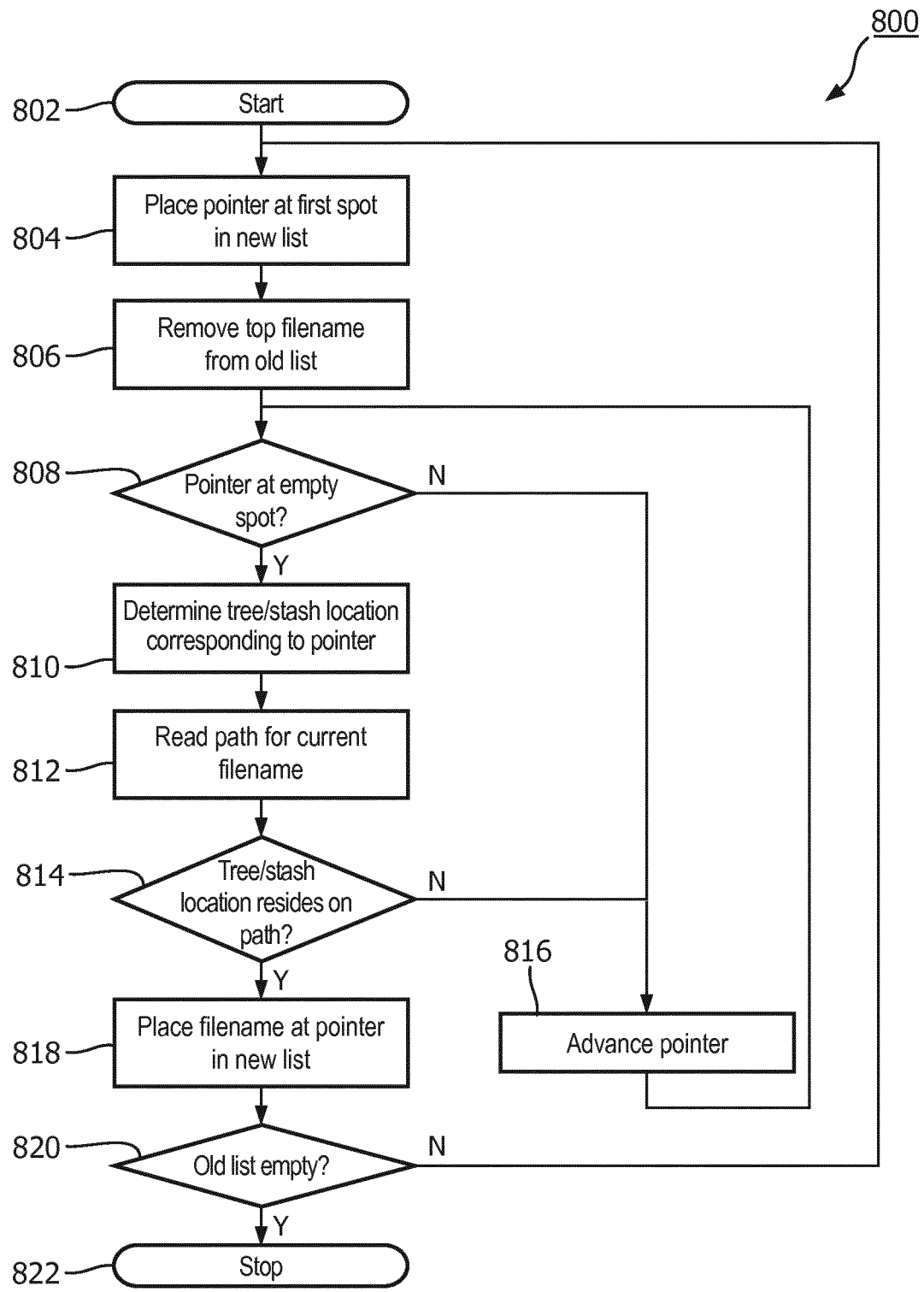
FIG. 8 illustrates an example of a method performed by a key server for relocating a requested file.

FIG. 8 illustrates an example of a method 800 performed by a key server for relocating a requested file. In various embodiments, the method 800 may correspond to on possible implementation of step 716 and, as such, may be performed by execution of the OFA orchestration software 262 of FIG. 2. As will be explained, the method 800 may be a greedy approach to placing files in the new list with the constraint that each file is placed at a location that remains on that file's assigned path in the key table. Various alternative methods for rearranging or otherwise shuffling a list of files will be apparent.

The method 800 begins in step 802 and proceeds to step 804 where the key server initializes a pointer to the beginning of the new list, which may be empty initially. Next, in step 806, the key server removes the top filename from the old list so that it can be placed in the new list. In step 808, the key server determines whether the pointer is currently pointing to an empty spot in the new list. If not, the current spot is occupied by a file and cannot also store the current file. As such, the key server advances the pointer to the next spot in the list in step 816, and the method loops back to step 808 to evaluate this new spot in the list.

Once the key server finds an empty spot in the new list, the method 800 proceeds to step 810 where the key server determines what location in the data structure corresponds to the current position in the new list as determined by the pointer. For example, as described above, this may be determined by using a lookup table associated with the current path that maps file list indices to data structure locations (e.g., node and file number). Next, in step 812, the key server determines on which path the current file resides, as determined by the key table entry for that file.

In step 814, the key server determines whether the location determined in step 810 resides on the path determined in step 812. As described above, this may be accomplished, for example, by a lookup table that maps each path to the identifications of the nodes on the tree (and the stash) that belong to that path. If the location is not on the path for this file name, then the file cannot be placed at this location without breaking the constraint that the file remains on its assigned path in the key table. In such a case, the key server advances the pointer in step 816 and the method 800 loops back to step 808 to assess this next position.

Once the key server has found an empty spot in the new list that resides on the currently-assigned path for the current file, the method 800 proceeds to step 818 where the key server places the filename in the new list at the location specified by the pointer. In step 820, the key server determines whether additional filenames remain in the old list to be moved over to the new list. If the old list is not yet empty, the method 800 loops back to step 804 where the key server restarts the process to find a spot for the next file in the old list. Once all files have been moved from the old list to the new list, the method proceeds from step 820 to end in step 822.

Figure 9:
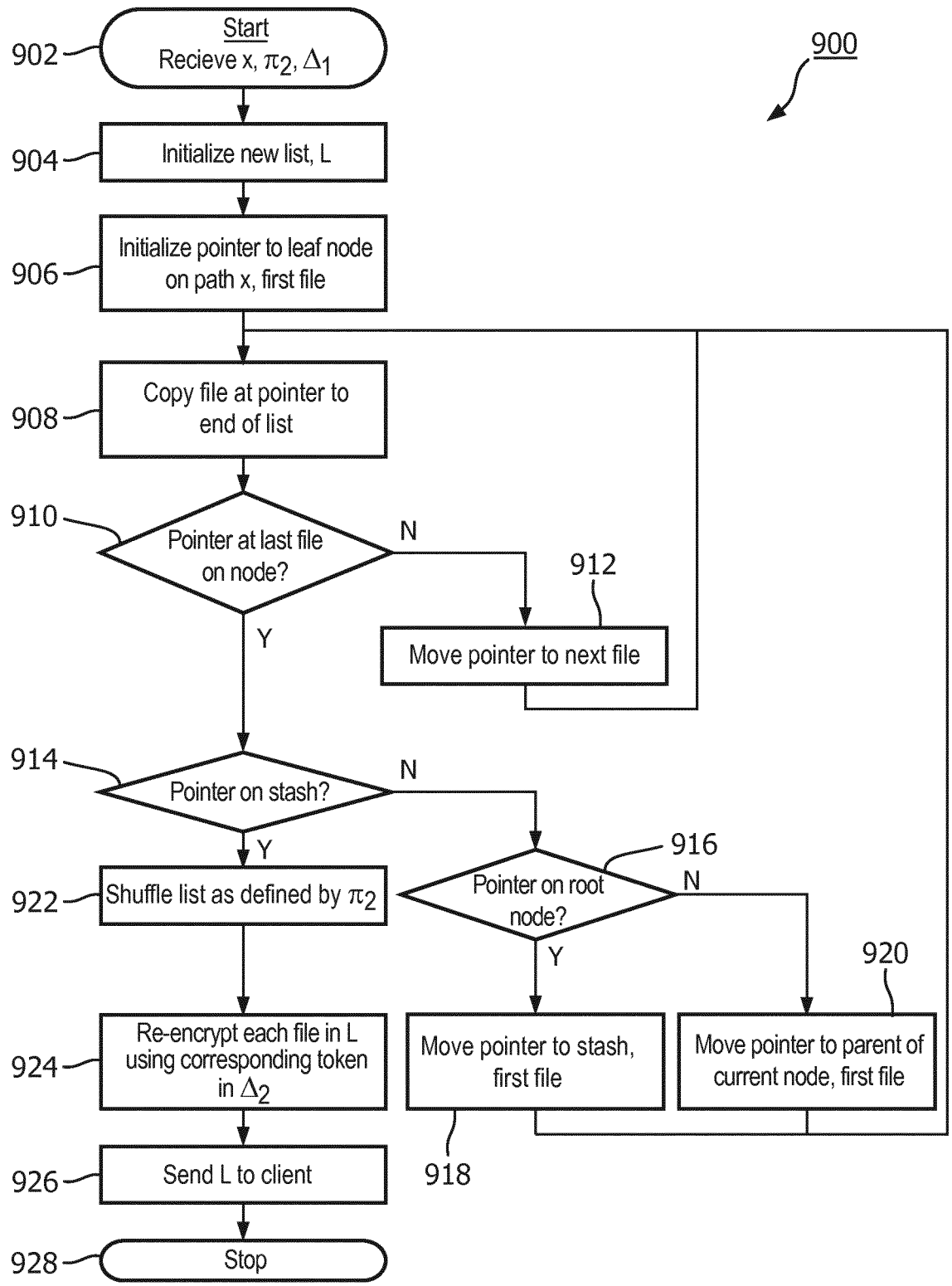
FIG. 9 illustrates an example of a method performed by a storage server for providing a file list to a client device.

FIG. 9 illustrates an example of a method 900 performed by a storage server (such as the storage server 130 of FIG. 3) for providing a file list to a client device. In various embodiments, the method 900 may correspond to various operations such as operations 510, 512, 514 of FIG. 5. In various embodiments, the method 900 may correspond to the OFA server software 273 of FIG. 2.

The method 900 begins in step 902 where the storage server receives a path to be sent as a file list, x, a permutation to be applied to the file list, $\pi_2$, and a set of re-encryption tokens to be used in re-encrypting the files in the file list, $\Delta_1$. These values may be received, for example, from a key server either directly or via another device, such as the client device. In various embodiments, the key server may have sent these values in step 748 of method 700. The method proceeds to step 904 where the storage server initializes a new, empty file list, L. Next, in step 906, the storage server initializes a pointer that points to a current file in the data structure. For example, the storage server may identify the leaf node in the tree that corresponds to the path, x, and set the pointer to the first file in that leaf node. For example, looking at FIG. 3 for path x=3, the storage server may initialize the pointer to the first file in node 9 320 (i.e., file "O").

After initializing the file list and pointer, the storage server begins to iteratively move each file on the path into the file list, L, by first, in step 908, copying the file residing at the location indicated by the current pointer into the first empty spot in the file list (i.e., placing the file at the end of the list according to the approach to filling the list used herein). The storage server then begins to determine to where the pointer will move to locate the next file to be copied. In step 910, the storage server determines whether the pointer currently points to the last file located on the current node. For example, where each tree node is allowed to have 2 entries, the storage server may determine whether 1) the pointer is on a tree node (not the stash), and 2) the pointer is on the second file on this node. As another example, in embodiments wherein files are removed from the data structure to be copied to the file list, the storage server may determine whether the current node under the pointer is empty. Various other approaches to determining whether a current node includes additional files to be copied will be apparent. If the pointer is not at the last file on this node, the storage server may advance the pointer to the next file on the same node in step 912, and the method 900 may loop back to step 908 so that this next file can also be copied to the file list.

Once all files on the current node have been copied, the method 900 will proceed to step 914 where the storage server may determine whether the pointer is currently on the stash. This may be performed according to various techniques such as, e.g., determining whether the pointer falls within an address space associated with the stash, determining whether the pointer is associated with an index into the data structure that corresponds to the stash (e.g., where the stash is embodied as a node within, but unconnected to, the tree), or determining whether a flag has been set indicating that the pointer is within the stash (e.g., as may be set by step 918). If the pointer is not yet on the stash, the method 900 proceeds to step 916 where the storage server determines whether the pointer is on the root node of the tree. Again, various approaches may be used to make this determination such as analyzing an address or index of the pointer, or by reading a flag.

If the pointer is not yet on the root node, this may indicate that additional nodes within the tree remain to be processed on the path, x (due to the fact that, in this particular embodiment, the storage server traverses the tree from leaf to root). As such, the pointer may be moved to the first file on the parent of the current node in step 920. The method 900 may then loop back to step 908 to process this next file. Once the files on the root node have been copied to the new list, the method 900 will proceed from step 916 to step 918 where the pointer will be repositioned at the first file in the stash so that the method 900 may loop back to step 908 and begin copying the files from the stash into the list. Once the last file from the stash has been copied to the file list (and thus all files on the path have been copied to the file list), the method 900 may proceed from step 914 to step 922.

In step 922, the storage server shuffles the file list according to the permutation, $\pi_2$, provided by the key server and then, in step 924, re-encrypts each file in the now-shuffled file list according to a re-encryption technique using the respective tokens in the token set, $\Delta_1$ provided by the key server. Various modifications will be apparent. For example, where the key server instead expects that the re-encryption tokens be applied to the file list in the order it originally resides in the data structure, steps 922 and 924 may be reversed. After performance of the obfuscation operations, the storage server may transmit the file list to the client for the next phase of the file access operation in step 926 and the method 900 proceeds to end in step 928 as the storage server awaits the return of the file list to be committed back to the data structure for subsequent file accesses.

In various embodiments, while the storage server waits for the return of the file list, the data structure may be locked against other accesses. As such, no other requests may be served in this time. If additional instructions for further accesses are received from the key server, the storage server may store these in a queue for future execution. Alternatively, in some embodiments, the key server may maintain locks against the data structure and delay additional requests until the storage server reports successful re-committal of a file list. As yet another alternative, in some embodiments, only a portion of the total corpus of files storage in the system may be locked at a given time. For example, in some embodiments, the data structure may not include any files that belong to all file groupings (as in the case of the root node and stash of the examples described here). In some such embodiments, only those portions of the data structure that include file groupings overlapping the currently-accessed grouping may be locked. In some embodiments, files may be distributed across two or more independent file structures (either on a single storage server or among multiple storage servers); upon access of a file, a lock may be applied to only the data structure in which that file resides.

Figure 10:
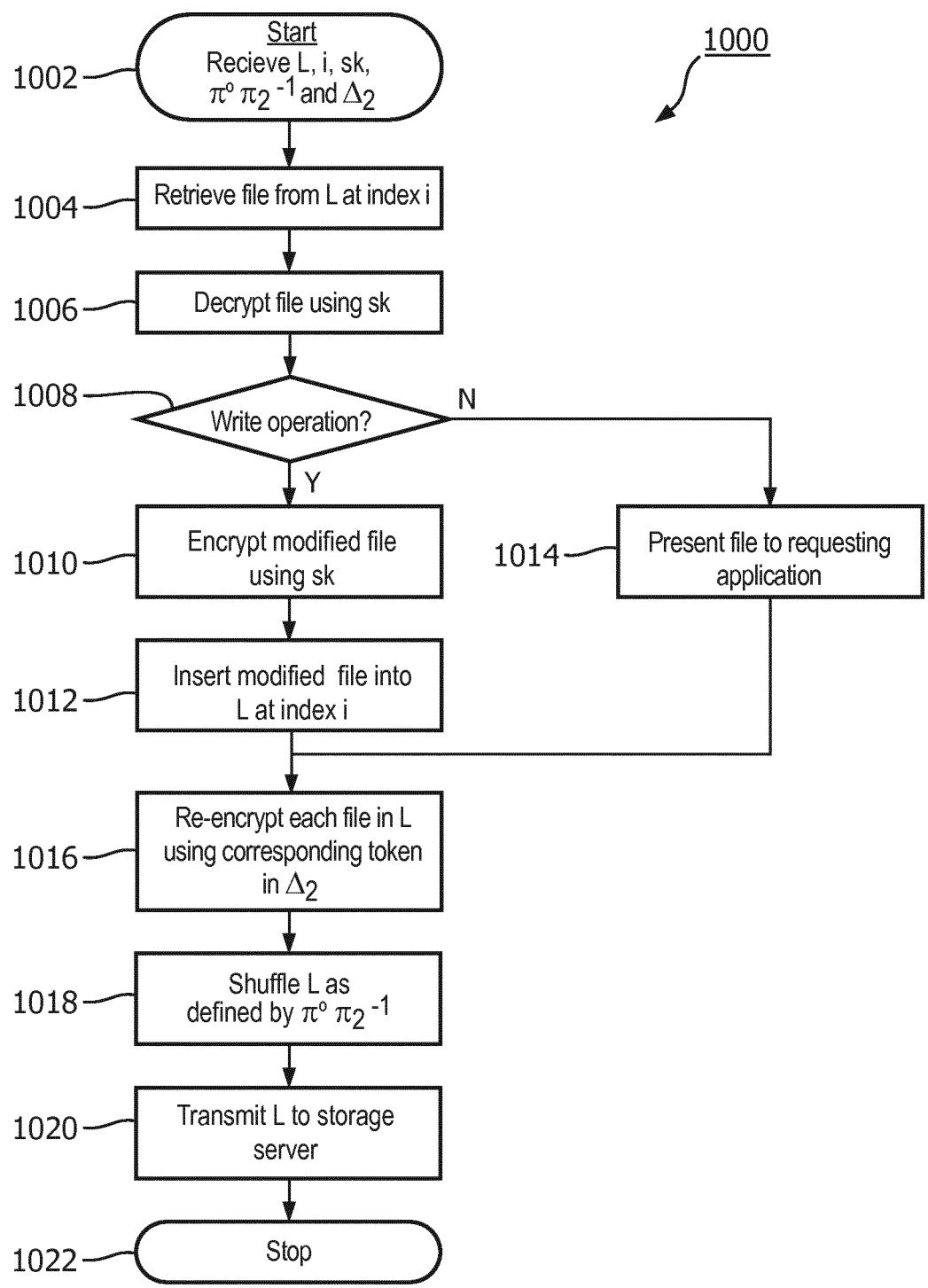
FIG. 10 illustrates an example of a method performed by a client device for obtaining a file from a file list and returning the file list to the storage server.

FIG. 10 illustrates an example of a method 1000 performed by a client device for obtaining a file from a file list and returning the file list to the storage server. In various embodiments, the method 1000 may correspond to various operations such as operations 516, 520, 522, 524 of FIG. 5. In various embodiments, the method 1000 may correspond to the OFA client software 283 of FIG. 2.

The method 1000 begins in step 1002 where the storage server receives a file list, L, an index, i, and encryption key, sk, a permutation to be applied to the file list, $\pi \circ \pi_2^{-1}$, and a set of re-encryption tokens to be used in re-encrypting the files in the file list, $\Delta_2$. In some embodiments, these values may be received among two or more messages sent by two or more separate devices. The file list L may be received from the storage server, either directly or via another device such as the key server. The remaining values may be received, for example, from a key server either directly or via another device, such as the storage server. In various embodiments, the storage server may have sent the file list in step 926 of method 900 and the key server may have sent the remaining values in step 746 of method 700.

After obtaining the file list and the other values for accessing and obfuscating the file list, the method 1002 proceeds to step 1004 where the client retrieves the file located within the file list at the index identified by i. Next in step 1006, the client decrypts the retrieved file using the provided key, sk. From here, the client determines in step 1008 whether the current access is a write operation or another operation, such as a read operation. If a write operation is to occur, the client obtains the modified file to be committed to storage (e.g., as modified by a client application such as a word processor or other program), encrypts the modified file using the encryption key, sk, and inserts the newly-encrypted file back into the file list at the position identified by i. Alternatively, in some embodiments, such as those employing asymmetric encryption, a different key (e.g., a public key) may be used for encryption, while the encryption key, sk, (e.g., a private key) may be used for decrypting. If, on the other hand, the operation is not a write operation, the client may simply pass the decrypted file to the requesting application in step 1014.

After the file access has been achieved, the method proceeds to step 1016, where the client re-encrypts the files in the file list according to the provided re-encryption tokens $\Delta_2$ in step 1016 and shuffles the file list according to the provided permutation $\pi \circ \pi_2^{-1}$ in step 1018. Finally, the client transmits the obfuscated (and potentially modified) file list back to the storage server in step 1020 and the method 1000 proceeds to end in step 1022.

It will be apparent that various modifications to the order of the steps may be possible. For example, in some embodiments the key server may expect that the file be encrypted according to the final key (i.e., after application of both sets of re-encryption tokens) and inserted into file list according to the final order of the files; in some such embodiments, steps 1004-1012 may be performed after step 1018. As another alternative, in some embodiments a write operation may not require the previous version of the requested file to be accessed and decrypted at all (e.g., where a previous read access presented the file to the user or client application and the current access is for the sole purpose of committing a modified version back to the storage); in some such embodiments, steps 1004, 1006 may be moved to occur immediately prior to step 1014. Alternatively, a separate step may be included after step 1006 to verify that the accessed file is indeed the file that is intended to be overwritten. As yet another alternative, in embodiments wherein the key server expects the re-encryption keys to be applied to the file list in its final order, steps 1016 and 1018 may be reversed.

Figure 11:
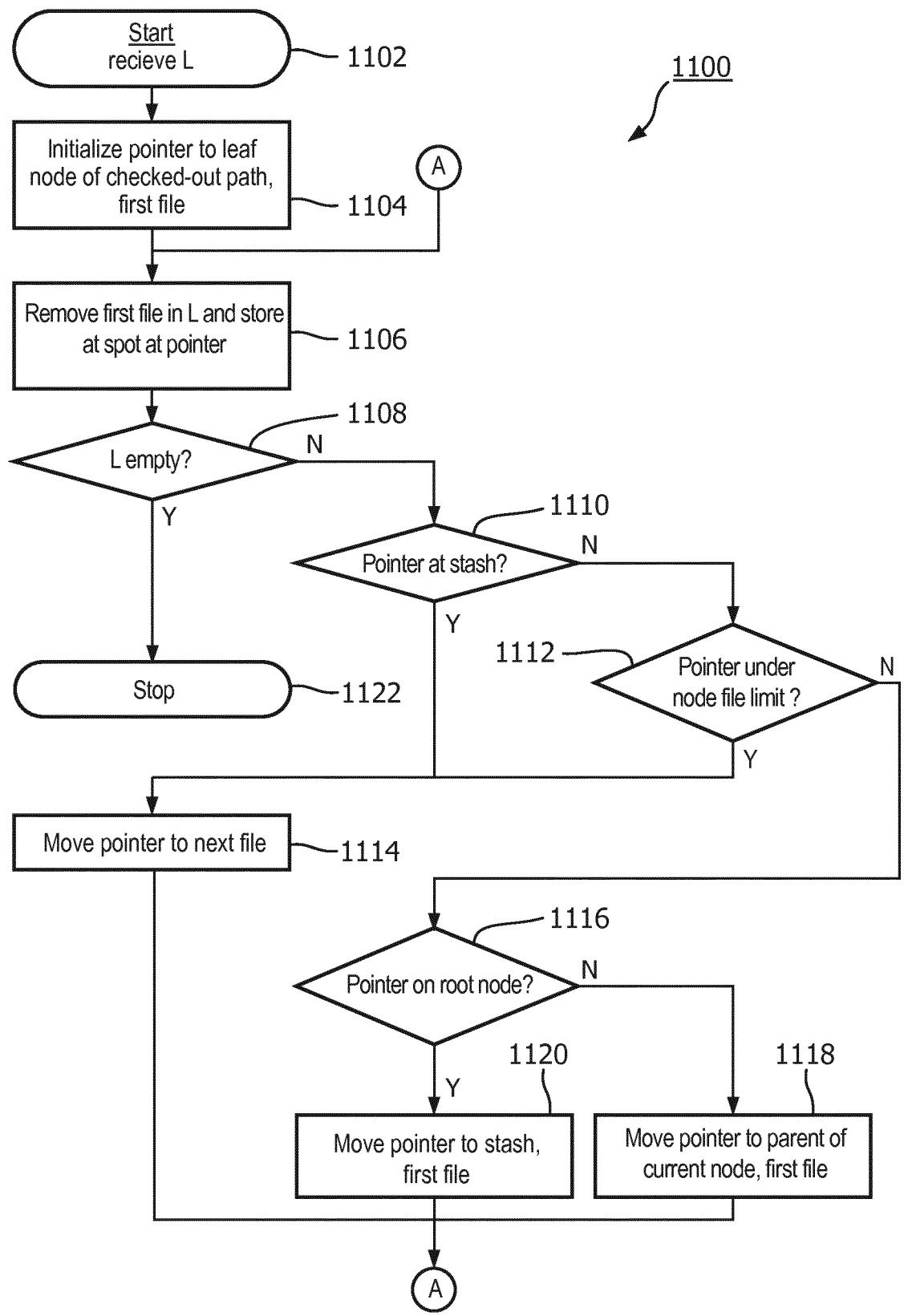
FIG. 11 illustrates and example of a method performed by a storage server for committing a modified file list to storage.

FIG. 11 illustrates an example of a method 1100 performed by a storage server for committing a modified file list to storage. In various embodiments, the method 1100 may correspond to various operations such as operation 526 of FIG. 5. In various embodiments, the method 1100 may correspond to the OFA server software 273 of FIG. 2.

The method begins in step 1102 where the storage server receives the file list, L, from the client either directly or indirectly via another device, such as the key server. In various embodiments, the client may have sent the file list in step 1020 of method 1000. The method proceeds to step 1104 where the storage server initializes a pointer to the leaf node of the path previously transmitted to the client. For example, at some point in method 900, the storage server may record the identifier of the path that is being transmitted or, if the files are literally removed from the data structure when the file list is sent in method 900 (or a method similar thereto), the storage server may simply identify the empty leaf node. As yet another alternative, the client may transmit an indication of the path (either encrypted or in the clear where the client can be trusted with the path identified) with the file list.

After initializing the pointer, the storage server begins to iteratively transfer the files from the received file list back into the data structure by, in step 1106, removing the first file in the file list and transferring it into the data structure at the location indicated by the pointer. Next, the storage server determines in step 1108 whether additional files remain to be transferred by determining, for example, whether the file list is now empty.

If the file list is not yet empty, the storage server proceeds to determine to where the pointer should be advanced for transferring the next file. In step 1100, the storage server determines whether the pointer is currently on the stash and, if not, determines in step 1112 if the pointer is currently under the node file limit. For example, if the pointer is on the first file of a node and the limit is two files per node, the pointer may be judged as under the file limit. If the pointer is either on the stash or under the current (tree) node's file limit, the storage server simply moves the pointer to the next file on the current node in step 1114. The method then loops back to step 1106 to handle the next file in the file list.

Once the pointer reaches the file limit for the current node (e.g., if the pointer is on file 2 and the file limit per tree node is 2), the method 1100 proceeds from step 1112 to step 1116. Here, the storage server determines to what node the pointer should be moved by determining whether the pointer is currently on the root node of the tree. If the pointer has not yet reached the root node, the storage server moves the pointer up to the first file on the parent of the current node in step 1118. Once the pointer reaches the last file on the root node, the storage server moves the pointer to the first file in the stash in step 1120. After moving the pointer, the method 1100 loops back to step 1106 handle the next file in the file list. The storage server continues moving files from the file list back into the data structure in this manner until the file list is empty, at which point the method 1100 proceeds to end in step 1122.

It should be apparent from the foregoing description that various example embodiments of the invention may be implemented in hardware or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method performed by a key server for facilitating access to a file by a client device and other parties, the method comprising:
  receiving, from the client device, an indication of a requested file;
  identifying an ordered grouping of files to which the requested file belongs on a storage server;
  determining an index of the requested file within the grouping, wherein the index is suitable to locate the requested file within the ordered grouping after the ordered grouping has been shuffled according to a permutation;
  determining an instruction for the storage server to perform an obfuscating operation, wherein the determining the instruction includes identifying the permutation to be used to shuffle the ordered grouping;
  transmitting the instruction for the storage sever to perform the obfuscating operation to the storage server;
  instructing the storage server to transmit the grouping of files to the client device; wherein the instructing includes the permutation to be used to shuffle the ordered grouping: and
  transmitting the index to the client device.

2. The method of claim 1, wherein each file in the grouping of files is encrypted, the method further comprising:
  determining an encryption key to be used in decrypting the requested file; and
  transmitting the encryption key to the client device.

3. The method of claim 2, wherein:
the instruction for the storage server to perform an obfuscating operation comprises a re-encryption token,
determining the instruction for the storage server to perform an obfuscating operation comprising generating the re-encryption token to be applied to re-encrypt the requested file,
wherein the encryption key is suitable to decrypt the requested file after the requested file has been re-encrypted according to the re-encryption token wherein generating a re-encryption token comprises generating a set of re-encryption tokens to be applied to re-encrypt respective files within the ordered grouping of files.

4. The method of claim 2, further comprising:
generating a re-encryption token to be applied to re-encrypt the requested file; and
transmitting the re-encryption token to the client device.

5. The method of claim 1, further comprising:
retrieving a master encryption key previously stored for the requested file;
transforming the master encryption key based on the re-encryption token; and
storing the transformed master encryption key for the requested file.

6. The method of claim 1, further comprising:
identifying a permutation to be used to shuffle the ordered grouping; and
transmitting the permutation to the client device.

7. The method of claim 1, further comprising:
selecting a new grouping of files for the requested file at random;
identifying a new location of the requested file within a data structure including a plurality of overlapping groupings, wherein the new location belongs to both the ordered grouping of files and the new grouping of files; and
storing the new location for the requested file,
wherein the permutation defines a new order for the ordered grouping of files that includes the requested file at position corresponding to the new location.

8. A method performed by a storage server, the method comprising:
receiving, from a key server, an identification of a grouping of files and an instruction to perform an obfuscating operation on the grouping of files, wherein the grouping of files is an ordered grouping of files and wherein the instruction to perform the obfuscating operation includes a permutation of the ordered grouping of files;
retrieving the grouping of files from a data store of the storage server;
performing the obfuscating operation on the grouping of files, which includes shuffling the ordered grouping of files according to the permutation; and
transmitting the grouping of files to a client device.

9. The method of claim 8, wherein:
the data store includes a tree data structure storing a plurality of files,
the identification of the grouping of files is an identification of a leaf node of the tree data structure, and
retrieving the grouping of files comprises retrieving files stored on the tree between a root node and the identified leaf node of the tree data structure.

10. The method of claim 8, further comprising:
receiving a modified version of the grouping of files from the client device; and
storing the modified version of the grouping of files in the data store in place of the grouping of files.

11. The method of claim 8, wherein:
the respective files within the grouping of files are encrypted,
the instruction to perform an obfuscating operation comprises a set of re-encryption tokens, and
performing the obfuscating operation comprises re-encrypting respective files within the grouping of files based on corresponding re-encryption tokens of the set of re-encryption tokens.

12. A method performed by a client device for accessing a file, the method comprising:
requesting, from a key server, access to a requested file;
receiving, from a storage server, an ordered grouping of files;
receiving, from the key server, an index and an instruction to perform an obfuscating operation, wherein the instruction to perform the obfuscating operation includes a permutation of the ordered grouping of files;
retrieving the requested file from the ordered grouping of files at a location specified by the index;
performing the obfuscating operation on the ordered grouping of files, wherein performing the obfuscating operation includes shuffling the ordered grouping of files according to the permutation; and
transmitting the obfuscated ordered grouping of files to the storage server.

13. The method of claim 12, wherein the requested file is encrypted in the ordered grouping of files, the method further comprising:
receiving, from the key server, an encryption key; and
decrypting the requested file using the encryption key.

14. The method of claim 12, wherein:
the instruction to perform an obfuscating operation comprises a set of re-encryption tokens, and
performing the obfuscating operation comprises re-encrypting respective files within the ordered grouping of files based on corresponding re-encryption tokens of the set of re-encryption tokens.

15. The method of claim 12, further comprising:
obtaining a modified version of the requested file; and
inserting the modified version of the requested file into the ordered grouping prior to performing the obfuscating operation.

16. A key server for facilitating access to a file by a client device and other parties, the key server comprising:
a communication interface;
a memory; and
a processor in communication with the communication interface and memory, the processor being configured to:
receive, from the client device, an indication of a requested file;
identify an ordered grouping of files to which the requested file belongs on a storage server;
determine an index of the requested file within the grouping;
determine an instruction for the storage server to perform an obfuscating operation, wherein the instruction to perform the obfuscating operation includes a permutation of the ordered grouping of files and a shuffling of the ordered grouping of files according to the permutation;

transmit the instruction for the storage server to perform an obfuscating operation to the storage server;

instructing the storage server to transmit the grouping of files to the client device; and transmit the index to the client device.

17. A storage server comprising:

a communication interface;

a memory; and a processor in communication with the communication interface and memory, the processor being configured to:

receive, from a key server, an identification of a grouping of files and an instruction to perform an obfuscating operation on the grouping of files, wherein the instruction to perform the obfuscating operation includes a permutation of an ordered grouping of files and a shuffling of the ordered grouping of files according to the permutation;

retrieve the grouping of files from a data store of the storage server;

perform the obfuscating operation on the grouping of files; and transmit the grouping of files to a client device.

18. A client device for accessing a file, the client device comprising:

a communication interface;

a memory; and a processor in communication with the communication interface and memory, the processor being configured to:

request, from a key server, access to a requested file;

receive, from a storage server, an ordered grouping of files;

receive, from the key server, an index and an instruction to perform an obfuscating operation, wherein the instruction to perform the obfuscating operation includes a permutation of the ordered grouping of files and a shuffling of the ordered grouping of files according to the permutation;

retrieving the requested file from the ordered grouping of files at a location specified by the index;

perform the obfuscating operation on the ordered grouping of files; and transmit the obfuscated ordered grouping of files to the storage server.

19. A non-transitory machine-readable medium encoded with instructions for perform the method according to claim 1.

* * * * *